US008411940B2

(12) United States Patent
Dauw et al.

(10) Patent No.: US 8,411,940 B2
(45) Date of Patent: Apr. 2, 2013

(54) METHOD FOR FAST UP-SCALING OF COLOR IMAGES AND METHOD FOR INTERPRETATION OF DIGITALLY ACQUIRED DOCUMENTS

(75) Inventors: Michel Dauw, Machelen (BE); Patrick Verleysen, Wavre (BE); Xavier Gallez, Meux (BE); Pierre De Muelenaere, Court-Saint-Etienne (BE)

(73) Assignee: I.R.I.S., Mont-Saint-Guibert (BE)

( * ) Notice: Subject to any disclaimer, the term of this patent is extended or adjusted under 35 U.S.C. 154(b) by 18 days.

(21) Appl. No.: 12/673,534

(22) PCT Filed: Aug. 14, 2008

(86) PCT No.: PCT/EP2008/060713
§ 371 (c)(1),
(2), (4) Date: Feb. 15, 2010

(87) PCT Pub. No.: WO2009/021996
PCT Pub. Date: Feb. 19, 2009

(65) Prior Publication Data
US 2011/0206281 A1  Aug. 25, 2011

(51) Int. Cl.
*G06K 9/00* (2006.01)
*G06K 9/32* (2006.01)

(52) U.S. Cl. .................. 382/162; 382/299; 382/300

(58) Field of Classification Search ................ None
See application file for complete search history.

(56) References Cited

U.S. PATENT DOCUMENTS

| | | | |
|---|---|---|---|
| 5,844,991 A | 12/1998 | Hochberg et al. | |
| 5,937,085 A | 8/1999 | Ishida | |
| 5,956,425 A * | 9/1999 | Yoshida | 382/234 |
| 6,035,059 A | 3/2000 | Kurosawa et al. | |
| 6,347,156 B1 | 2/2002 | Kamada et al. | |
| 6,714,688 B1 | 3/2004 | Gallagher et al. | |
| 7,526,138 B1 * | 4/2009 | Souchard | 382/260 |
| 7,876,979 B2 * | 1/2011 | Lee et al. | 382/300 |
| 2002/0084978 A1 * | 7/2002 | Araki et al. | 345/156 |
| 2002/0136447 A1 * | 9/2002 | Link et al. | 382/163 |
| 2004/0117192 A1 | 6/2004 | Miletzki | |
| 2006/0077213 A1 * | 4/2006 | Li | 345/660 |
| 2006/0082846 A1 * | 4/2006 | Sakakibara et al. | 358/518 |

OTHER PUBLICATIONS

Bieniecki W. et al. "Image Preprocessing for Improving OCR Accuracy", International Conference on Perspective Technologies and Methods in MEMS Design, 2007.*
Bovik, A.C. (2000) "Handbook of Image and Video Processing, Communications, Networking and Multimedia", 1: 11.

(Continued)

*Primary Examiner* — Li Liu
(74) *Attorney, Agent, or Firm* — Jerold I. Schneider; Schneider Rothman Intellectual Property Law Group

(57) ABSTRACT

Method for up-scaling a color image prior to performing subsequent processing on said color image, comprising the steps of converting the color image into multiple image layers distinguishable from each other and up-scaling at least one of said multiple image layers. The up-scaling is tuned towards the subsequent processing, for example luminance is upscaled at higher quality than chrominance. Further, a method for interpreting information present on digitally acquired documents, comprising the steps of: (i) determining a country; (ii) identifying a list of languages and character sets in use in said country; (iii) performing optical character recognition simultaneously using all languages and character sets of the list; (iv) performing field parsing to identify fields in the digitally acquired document on the basis of international as well as country-specific field recognition rules; (v) storing the recognized information according to the identified fields in a database.

14 Claims, 6 Drawing Sheets scale up color image

OTHER PUBLICATIONS

Bovik, A.C. (2000) "Handbook of Image and Video Processing, Communications, Networking and Multimedia", 1: 539-551.

Mitchell, D.P. et al. (1988) "Reconstruction Filters in Computer Graphics", Proceedings of ACM SCCG. Conference on Computer Graphics. 22 (4): 221-228.

Youssef, S.M. et al. (2007) "A smart access control using an efficient license plate location and recognition approach", Expert Systems with Applications. 34 (1): 256-265.

* cited by examiner

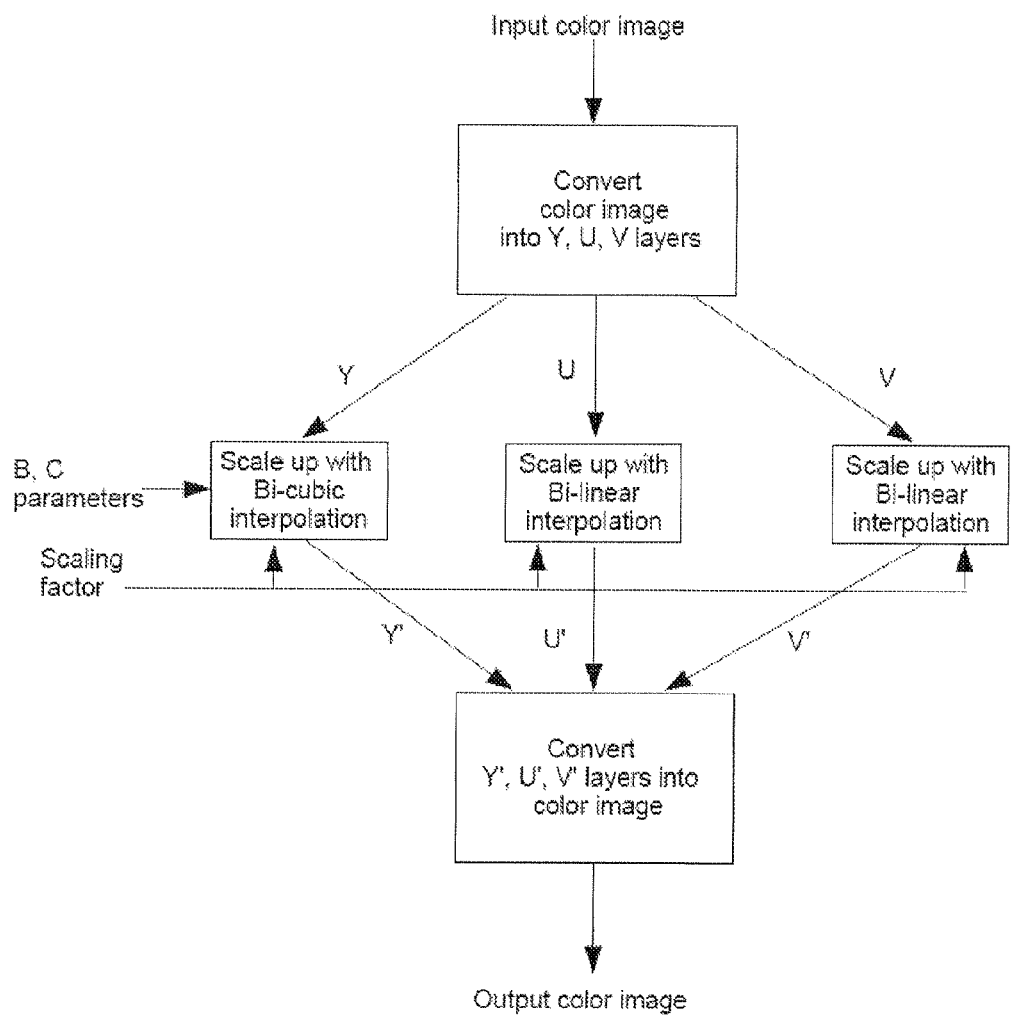
Figure 2: scale up color image

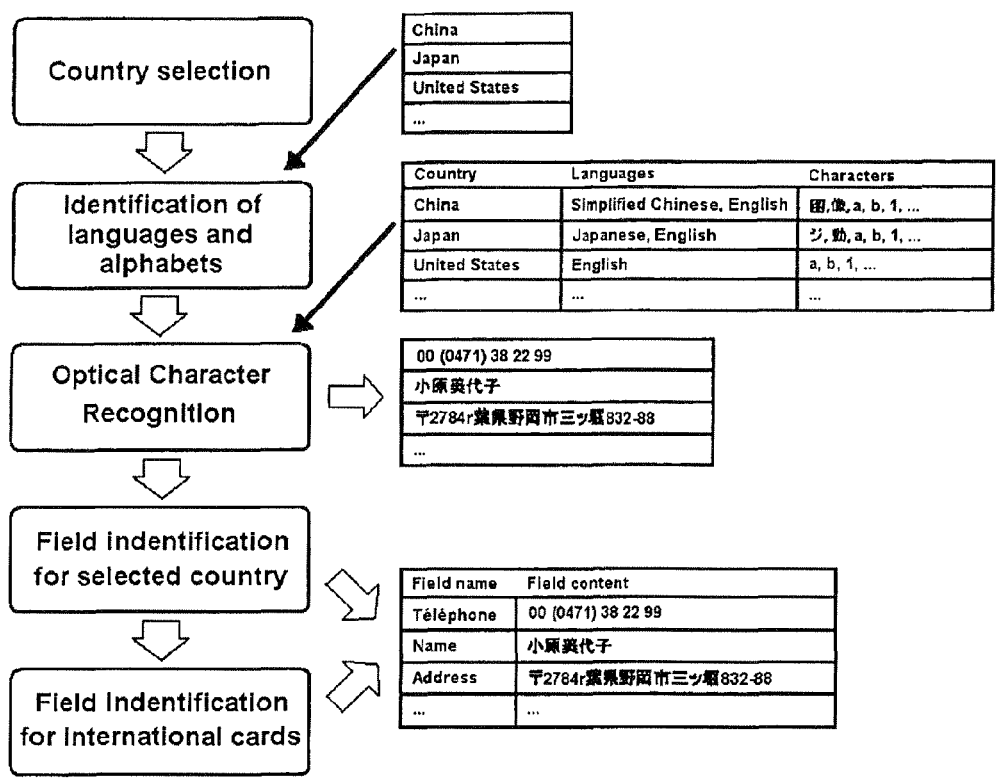
Figure 3: Architecture of a Business Card reading system able to read business cards coming from any country of the world.

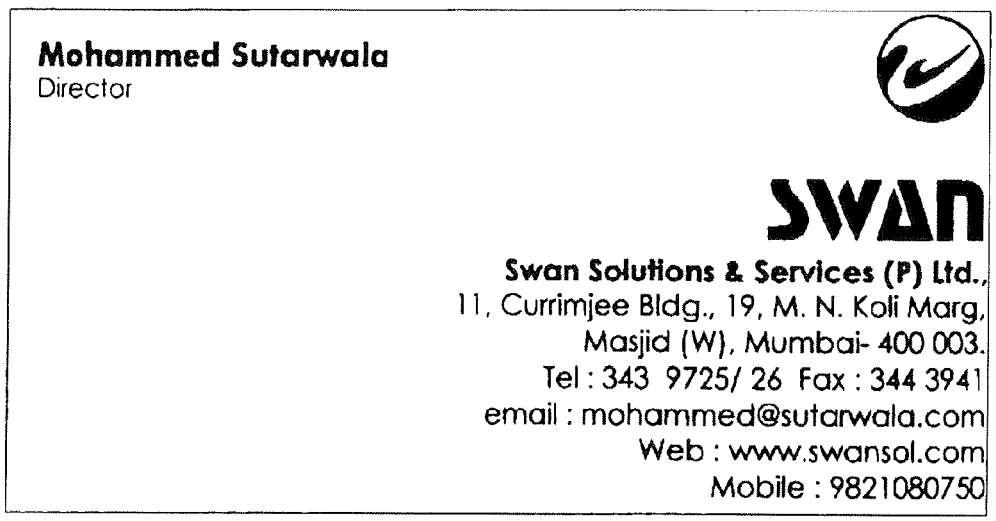
| Field | International parsing only |
|---|---|
| Telephone number | 343 9725/26 |
| Last name | Sutarwala |
| First name | Mohammed |
| Company | Swan Solutions & Services (P) ltd .. |
Figure 4: International field parsing on an Indian business card

| Field | International parsing | Country-specific parsing |
|---|---|---|
| First name | Not found | ΚΩΣΤΑΣ |
| Last name | Not found | ΦΩΤΑΡΑΣ |
| Telephone number | 6545802-5 | 6545802-5 |
| Fax number | Not found | 6545805 |
Figure 5: International and country-specific field parsing on a Greek business card

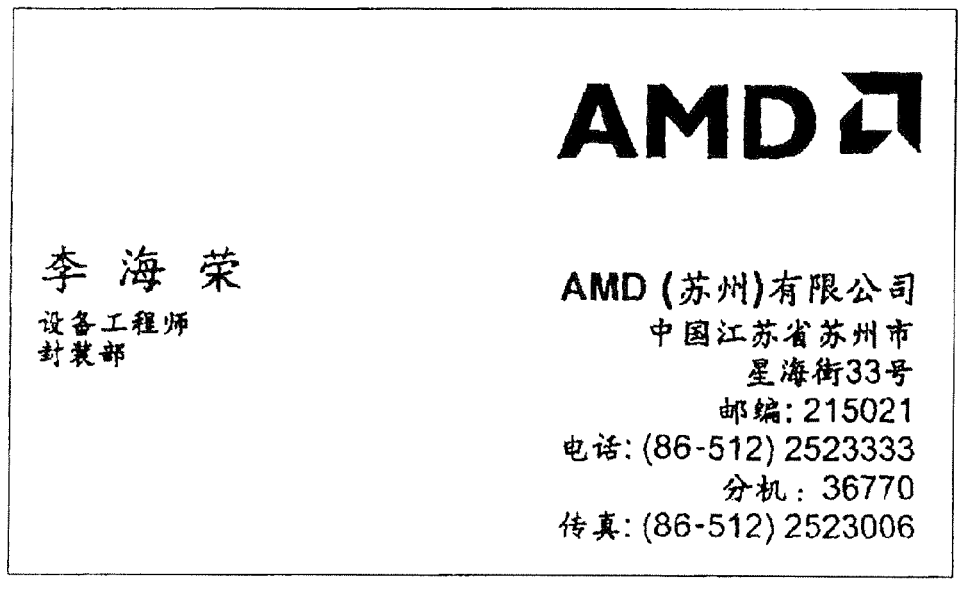
Figure 6: International and country-specific field parsing on a Japanese business card

METHOD FOR FAST UP-SCALING OF COLOR IMAGES AND METHOD FOR INTERPRETATION OF DIGITALLY ACQUIRED DOCUMENTS

CROSS-REFERENCE TO RELATED APPLICATIONS

This application is a §371 national stage entry of International Application No. PCT/EP2008/060713, filed Aug. 14, 2008, which claims priority to U.S. Provisional Patent Application 60/956,065, filed Aug. 15, 2007, both of which are hereby incorporated by reference in their entirety.

TECHNICAL FIELD

The present invention relates to a method for up-scaling (magnifying) a color digital image, especially an image of a digitally acquired document (e.g. taken by a scanner or a digital camera). The invention further relates to a method for interpretation of information present on a digitally acquired document, in particular business cards but not limited thereto.

BACKGROUND ART

A digital image is formed by an array of rows and columns of pixels. For a grayscale image, each pixel has one value representing the average luminance of the corresponding area. For a color image, each pixel has a red, green and blue value representing the average color of the corresponding area.

A pixel color can also be represented by the YUV (or YCrCb) representation, where Y is the luminance, U and V are the red and blue chrominance channels. It is possible to convert a color from the RGB representation into the YUV representation and vice-versa.

A digital image is characterized by its resolution which is the number of pixels in each direction per inch. An image with a resolution of 300 dpi (dot per inch) is an image which has 300 rows and 300 columns per inch.

A document is a set of pages that contains text but can also contain graphics, pictures, logos, drawings, .... A document can be for example a letter, a business card, an invoice, a form, a magazine or newspaper article. Documents are converted into digital images by a device called a scanner. They can also be converted into digital images by a digital camera. Documents are scanned so that they can be kept electronically and further processed by a computer.

The main processing application is text recognition or OCR (Optical Character Recognition) that allows the further processing of the recognized text.

For example, a business card is scanned into a color image. The text is recognized and then interpreted and decomposed into different fields like the name, the firm, the title, the address, etc. This information is kept in a database along with the color image. Users can consult the database and display the business card color images.

The OCR accuracy is of course very important. This accuracy depends on the quality of the printing and the quality of the scanning. The quality of the scanning is especially dependant of the resolution of the scanner. High resolutions will make digital images closer to the original ones with more details kept. Unfortunately, scanning at high resolution takes more time as more pixels must be determined by the scanner and transferred to the computer that will further process the digital image. High resolution scanners are also more costly.

It is estimated that OCR gives a good accuracy for normal text (10 pt and above) at a minimum of 300 dpi. However, many scanners are limited to 200 dpi and the most scanners give their optimal throughput at 200 dpi. For business cards, a minimum resolution of 400 dpi is however preferred for OCR as the text is very often written with a small point size (e.g. 8 pt).

There are well-known techniques for up-scaling a digital image. These use bilinear and bi-cubic interpolations. In those techniques, the grid of the destination image is mapped into the grid of the source image. The destination pixel values are estimated by using the source pixel values of the neighborhood. They are estimated by interpolation. The Bilinear interpolation takes into account the 4 nearest neighbors. The Bi-cubic interpolation takes into account the 16 nearest neighbors. Generally, interpolation has mainly 2 reconstruction errors: blurring and ringing.

Current Business card reading systems operate in two steps: the Optical Character Recognition (OCR) and the identification of the fields (field parsing). They are using OCR engines able to recognize characters from a reduced set of languages, one language at a time. They are using a field parsing module tailored to one country, thereby allowing for field identification rules specific to that country solely. As a result, current business card reading solutions are only able to recognize business cards from a very limited number of countries for instance 6 to 10 countries.

DISCLOSURE OF THE INVENTION

It is a first aim of the invention to provide a faster method for up-scaling a color image while maintaining sufficient accuracy for a subsequent processing of the image.

This first aim is achieved according to a first aspect of the invention with the method comprising the steps of the first independent claim.

It is a second aim of the invention to provided a more accurate optical character recognition method.

This second aim is achieved according to a second aspect of the invention with the method comprising the steps of the second independent claim.

It is a third aim of the invention to present a method capable of interpreting information present on digitally acquired documents, in particular business cards but not limited thereto, originating from a wide range of countries, preferably substantially all countries in the world.

This third aim is achieved according to a third aspect of the invention with the method comprising the steps of the third independent claim.

According to a first aspect of the invention, a method is presented for up-scaling a color image prior to performing subsequent processing on said color image. The up-scaling method comprising the steps of converting the color image into multiple image layers distinguishable from each other and up-scaling at least one of said multiple image layers. This up-scaling comprises the steps of taking among the multiple image layers a predetermined selection of at least one first image layer for up-scaling by means of a first up-scaling method, and then up-scaling only said at least one first image layer by means of said first up-scaling method, thereby forming at least one up-scaled first image layer. The first up-scaling method has a predetermined quality in view of the subsequent processing. Also the layer(s) which is/are singled out for up-scaling at this predetermined quality is/are predeterminedly chosen in view of the subsequent processing.

As a result, according to the first aspect of the invention, a method is presented with which only the more relevant layer(s) of the color image for the subsequent processing can be up-scaled at a sufficient, predetermined quality to enable or facilitate the subsequent processing (for example optical character recognition, image/document compression or other), and the less relevant layer(s) can be up-scaled at lesser quality or even disregarded. As a result, an image up-scaling technique is achieved for digitally acquired images or documents (e.g. scanned document or pictures taken by a digital camera) which is fast and accurate.

In particular, the first aspect of the invention enables a fast and accurate method that can scale digital images from one resolution to a higher resolution, for example from 200 dpi to 300 dpi or from 300 dpi to 400 dpi, etc. . . . The fastness of the method makes it possible to for example perform the scanning at a lower resolution and subsequently immediately up-scale the scanned images to a target resolution for a subsequent process like OCR. So the need for scanning directly at the target resolution can be avoided and the scanning process can be speeded up. The accuracy of the method makes it possible to achieve results which approach those of scanning directly at the target resolution.

In preferred embodiments, the method further comprising the steps of taking among said image layers a selection of at least one second image layer, up-scaling the at least one second image layer by means of a second up-scaling method and recombining the up-scaled first and second image layers into a destination color image. The second up-scaling method may have a lesser quality than said first up-scaling method.

In preferred embodiments, the layer(s) to be up-scaled at higher quality and the higher quality up-scaling method are chosen for facilitating an optical character recognition method. In this way, the first aspect of the invention can provide an image up-scaling technique optimized for text recognition.

In preferred embodiments, the at least one first image layer (which is/are up-scaled at higher quality) comprises a luminance layer.

In preferred embodiments, the at least one second image layer (which may be up-scaled at lesser quality) comprises two chrominance layers.

In preferred embodiments, the first up-scaling method is a bi-cubic method using splines in which parameters can be chosen to make a trade-off between blurring and ringing effects. In this way, the first aspect of the invention can provide an image up-scaling technique in which a trade-off is found between blurring and ringing reconstruction errors. One of said parameters can be estimated for at least one type of image acquiring device (scanner or other) with which color images are digitally acquired, by analyzing the sharpness of the images acquired by the device. One of said parameters can be estimated directly on the color image to be up-scaled by analyzing character edges of characters in the color image.

In preferred embodiments, the second up-scaling method is a bilinear method.

In preferred embodiments, a scaling factor is an input parameter of the up-scaling method.

According to a second aspect of the invention, which may or may not be combined with the other aspects of the invention, an optical character recognition method is presented which comprises the steps of converting a color image into luminance and chrominance layers and performing character recognition using mainly the luminance layer.

An analysis of the prior art has shown that accurate OCR processing can be achieved by using mainly the luminance of the color image and to a lesser extent the chrominance. So it can be sufficient that, in line with the first aspect described above, only one of three pixel values is interpolated with an accurate but time-consuming method while the two others may be interpolated with a less accurate but faster method.

In preferred embodiments, the OCR method involves an up-scaling method according to the first aspect of the invention.

In alternative embodiments, the OCR method may involve disregarding the chrominance layers or looking at the luminance layer first and looking only at the chrominance layers in cases of uncertainty or for error correction.

The OCR method may for example be applied on scanned documents such as for example business cards, paper pages or any other documents.

According to a third aspect of the invention, which may or may not be combined with the other aspects of the invention, a method is presented for interpreting information present on digitally acquired documents. The method comprises the steps of: (i) determining a country where the digitally acquired document originates from; (ii) identifying a list of languages and character sets in use in said country; (iii) performing optical character recognition on information present in the digitally acquired document, simultaneously using all languages an character sets of the list; (iv) performing field parsing to identify fields in the digitally acquired document on the basis of international as well as country-specific field recognition rules; (v) storing the recognized information according to the identified fields in a database.

This method is capable of processing for example business cards coming from a wide range of countries, preferably substantially all countries in the world. This aim is achieved in that the method based on an initial country selection, is arranged for considering multiple alphabets and/or languages simultaneously and for using international as well as country-specific field recognition rules.

In preferred embodiments, step (i) comprises enabling a user to select the country from a predetermined list of countries.

In preferred embodiments, step (iii) comprises using lexicons for all the identified languages of the list.

In preferred embodiments, step (iv) comprises a step of keyword recognition on the basis of a dictionary with a country-specific part and an international part common to at least a large number of countries.

In preferred embodiments, step (iv) comprises a step of specific pattern recognition wherein phone numbers, addresses and words containing keywords are recognized with country-specific routines.

In preferred embodiments, step (iv) further comprises a step of rule processing for identifying to which field the recognized specific patterns belong, said rule processing being common for all countries.

The method may for example be applied for retrieving data such as for example names, addresses, phone numbers, e-mail addresses and the like from scanned business cards or letterheads, but is not limited thereto.

BRIEF DESCRIPTION OF THE DRAWINGS

The invention will be further elucidated by means of the following description and the appended figures.

FIG. 2 shows a flowchart of an up-scaling method according to a preferred embodiment of the invention.

FIG. 3 shows a flowchart of a method for interpreting information on a digitally acquired document according to a preferred embodiment of the invention.

FIGS. 4-6 show results of the application of the method of FIG. 3 on business cards originating from different countries.

MODES FOR CARRYING OUT THE INVENTION

Figure 1:
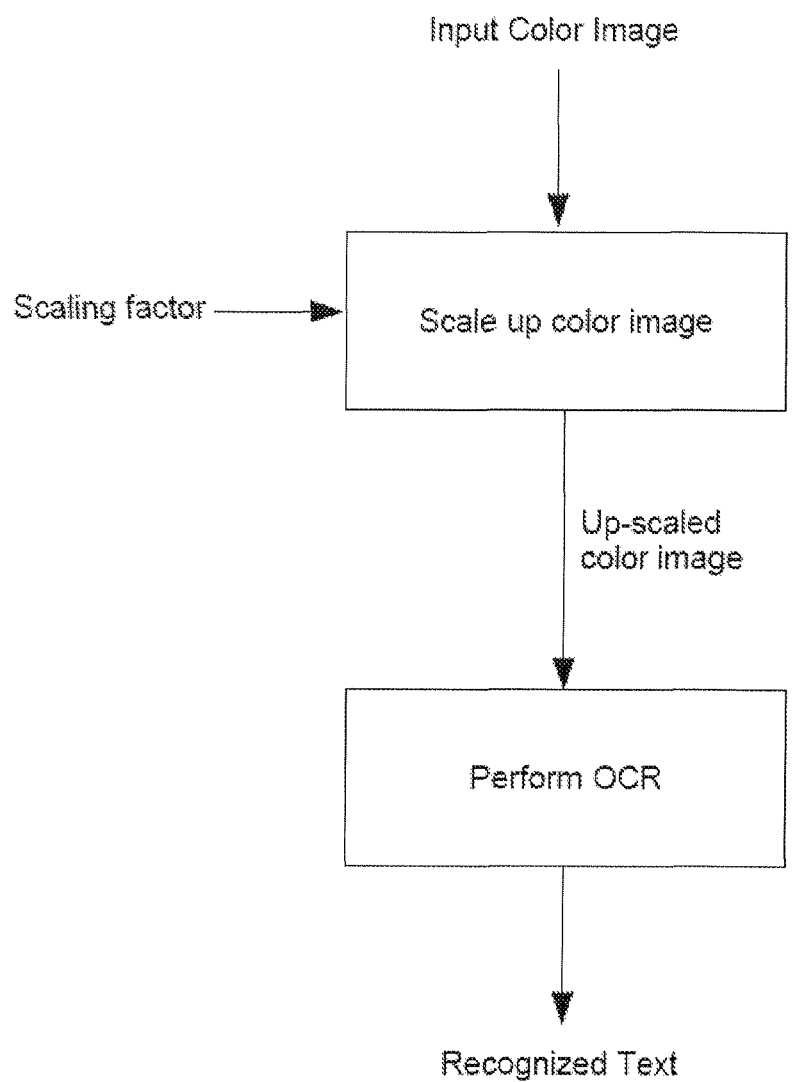
FIG. 1 shows a flowchart of an optical character recognition method according to a preferred embodiment of the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

FIGS. 1 and 2 relate to image up-scaling optimized for OCR purposes according to aspects of the invention. Note that the up-scaling method can also be optimized for other subsequent processing than OCR and that the OCR method according to the invention does not necessarily include the up-scaling method.

An advantage of the shown flowcharts is that an image up-scaling technique is provided for scanned documents (or taken by a digital camera or otherwise digitally acquired) which is fast and accurate.

An advantage of the shown flowcharts is that an image up-scaling technique is provided in which a trade-off is found between blurring and ringing reconstruction errors.

An advantage of the shown flowcharts is that an image up-scaling technique is provided in which the scaling factor is an input parameter.

In particular, the flowcharts of FIGS. 1 and 2 together provide a fast and accurate method that can scale digital images from one resolution to a higher resolution, for example from 200 dpi to 300 dpi or from 300 dpi to 400 dpi, etc. . . . The method is fast, so that scanning directly at the target resolution can be avoided. The method is accurate so that the result is near the result of scanning directly at the target resolution.

In general, the up-scaling method used in the flowchart of FIG. 1 at least comprises the steps of converting a source RGB color image to at least a luminance image and up-scaling the luminance image with an up-scaling technique of sufficient accuracy for OCR purposes. Preferred embodiments may include steps to convert the source RGB color image to chrominance images, upscale the chrominance images with an up-scaling technique of lesser quality and recombine the upscaled luminance and chrominance images to a destination RGB image. Preferably a bi-cubic method is used for up-scaling the luminance image and a bilinear method is used for up-scaling the chrominance images. However, other up-scaling methods may also be used, provided that the quality of at least the up-scaling method for the luminance image is sufficient for OCR purposes. Up-scaling of the chrominance images is not essential.

An analysis of the prior art up-scaling techniques has shown the following. Bilinear interpolation is fast but gives an image which is too blurred for OCR. When the image is too blurred, the OCR accuracy drops because it has difficulty to determine the character edges. Bi-cubic interpolation tends to preserve the edge values and result in less loss of valid pixel information but is unfortunately too time-consuming as it has to process 16 different source pixels (with 3 RGB values per pixel) to estimate one destination pixel. By separating the two-dimensional bi-cubic interpolation into one horizontal and one vertical cubic interpolation, the bi-cubic interpolation can be speeded up but it is generally still too time-consuming.

Cubic interpolation uses actually a spline which is a piecewise polynomial. Mitchell and Netravali has introduced an interesting family of cubic splines, the BC-splines:

for $|x|<1$:

$$f(x)=(12-9*B-6*C)*|x|**3+(-18+12*B+6*C)*|x|**2+(6-2*B)$$

for $1<=|x|<2$:

$$f(x)=(-B-6*C)*|x|**3+(6*B+30*C)*|x|**2+(-12*C-48*C)*|x|+(8*B+24*C)$$

otherwise $$f(x)=0$$

where B and C are parameters that control the shape of the cubic curves and thus the appearance of the output image. B and C can be chosen to make the trade-off between blurring and ringing effects. Mitchell and Netravali have shown that for a good reconstruction, 2C+B should be equal to 1. See Mitchell, Don P. and Netravali, Arun N., "Reconstruction Filters in Computer Graphics", Computer Graphics, Vol. 22, No. 4, August 1988, pp. 221-228, which is incorporated herein by reference in its entirety.

According to the invention, it is discovered that blurring is sometimes acceptable and even desirable for OCR. It allows to get rid of noises or imperfections in the colors of the text or the colors of the background of the text in order to suppress "false" edges. As a result, the Cubic BC-splines are very interesting for document image up-scaling. If the acceptable blurring effect is known, the ringing error can be minimized.

If, for example, it is estimated that the source image is already too blurred, B can be set to 0 and C to 0.5.

If, for example, it is estimated that the source image is sharp enough, B can be set to 1 and C to 0.

The estimation of the B parameter can be performed scanner type by scanner type by analyzing the sharpness of the images produced by the scanner.

The B parameter could also be estimated directly on the document image to upscale by analyzing the pixels luminances in particular by analyzing the character edges.

According to the invention, it is found that accurate OCR processing can be achieved by using mainly the luminance of the color image and to a lesser extent the chrominance. So it can be sufficient that only one of three pixel values is interpolated with an accurate but time-consuming method while the two others may be interpolated with a less accurate but faster method.

The algorithm of FIG. 2, which is a preferred up-scaling method, comprises the following steps. The input color image will mostly be an RGB color image but may also be any other format known to the person skilled in the art.

1. The RGB color image is converted into 3 layers: Y (luminance), U and V (2× chrominance).
2. The Y layer is up-scaled into a Y' layer with the bi-cubic method (BC-splines) with B and C as parameters and the scaling factor as an additional parameter.
3. The U and V layers are up-scaled into a U' and V' layers with the bilinear method and the scaling factor as an additional parameter.
4. The Y', U' and V' layers are converted/recombined into the RGB destination color image.

With this sequence, a fast and accurate up-scaling method is achieved. It is more than 2.5 times faster than the direct bi-cubic interpolation of the RGB color image.

It is also to be noted that the result is very acceptable for the human eye. As a matter of fact, the human eye is more sensible to the luminance than to the chrominance.

An aspect of the invention relates to interpretation of scanned documents, in particular business cards but not limited thereto.

FIG. 3 presents a method for processing business cards coming from a wide range of countries, preferably substantially all countries in the world. Based on an initial country selection, the method is arranged for considering multiple alphabets and/or languages simultaneously and for using international as well as country-specific field recognition rules.

In preferred embodiments a new system architecture and a new algorithm is described that is arranged also for reading business cards from countries where several languages are spoken or several alphabets are used (e.g. Belgium with 3 official languages French, Dutch and German, or Taiwan where Traditional Chinese pictograms and/or English alphabets is being used. The system allows for easy maintenance, allowing to incorporate new improvements in the OCR and Field Identification algorithms.

The algorithm of the invention can for example operate as follows (see flowchart depicted in FIG. 3):

1. Users a priori select the business card's country from the ISO 3166 list of countries. In the current implementation, 217 are allowed for.
2. Based on the selected country, the algorithm transparently builds up a list of languages and character sets (alphabets) in use in that country.
3. The algorithm uses special OCR modules that enable the simultaneous recognition of different languages, for example allowing the recognition of German, Dutch, French or Chinese and English.
4. This international OCR module is called with the selected character sets and languages. Several languages and alphabets are considered simultaneously by the OCR engine. As a consequence, the algorithm can accurately recognize characters from business cards data that comprise a mixture of languages and alphabets (e.g. latin characters from English words on Chinese business cards or Latin characters on Greek business cards).
5. Once characters are recognized, a field parsing module is called. Field parsing rules specific to the business cards' country are capitalized on when available. Then, the more international field parsing module is called.

FIGS. 4-6 show examples of the results of the international vs. the country-specific field parsing rules.

The following is a more detailed description of a preferred embodiment of the field parsing/identification algorithm. The algorithm comprises three steps (see below): OCR keyword recognition, specific pattern recognition, rule processing. Steps 1 & 2 make use of both country-specific and common rules, while step 3 relies on country-specific rules only.

Step 1: Keyword Recognition
  Recognition of keywords from a dictionary
    The dictionary has a specific part for each country.
    The dictionary also has a part that is common to every country.
    Both the common part and the country specific part of the current country are used during the field recognition.
    All the dictionary parts are compiled into one big encrypted file.

Step 2: Specific Pattern Recognition
  Recognition of phone numbers
    Phone number formats are country specific. For each country, there is a dedicated routine that recognizes phone numbers.
  Recognition of addresses
    Zip code formats are country specific. For each country, there is a dedicated routine that recognizes addresses.
  Recognition of words containing keywords (like "strasse"—street in German)
    For each country that needs it, there is a dedicated routine that recognises these special words (e.g. Germany—Holland . . . )

Step 3: Rule Processing
  This step is a Post-processing of the result based on "rules" defined in a custom language interpreted from encrypted files.
    These rules are responsible for choosing the right fields among the keywords and patterns that were found in the previous step.
    These rules are shared by all countries.

As a result of the use of these country-specific rules as well as international rules, the method of the invention can be applied all over the world with sufficient quality of the recognition of information on the scanned business card or other document.

We claim:

1. A method for up-scaling a color image prior to performing subsequent processing on said color image, the up-scaling method comprising the steps of:
  a) converting the color image into multiple image layers distinguishable from each other;
  b) up-scaling at least one of said multiple image layers; wherein step b) comprises the steps of:
  c) taking among said image layers a predetermined selection of at least one first image layer for up-scaling by means of a first up-scaling method, said first up-scaling method having a predetermined quality;
  d) up-scaling only said at least one first image layer by means of said first up-scaling method, thereby forming at least one up-scaled first image layer;
  e) taking among said image layers a selection of at least one second image layer
  f) up-scaling the at least one second image layer by means of a second up-scaling method, thereby forming at least one up-scaled second image layer, said second up-scaling method having a lesser quality than said first up-scaling method;

g) recombining said up-scaled first and second image layers into a destination color image, and in that said predetermined selection and said predetermined quality are chosen for facilitating said subsequent processing.

2. The method of claim 1, wherein said subsequent processing is an optical character recognition method.

3. The method of claim 1, wherein said at least one first image layer comprises a luminance layer.

4. The method of claim 1, wherein said at least one second image layer comprises two chrominance layers.

5. The method of claim 1, wherein said first up-scaling method is a bi-cubic method using splines in which parameters can be chosen to make a trade-off between blurring and ringing effects.

6. The method of claim 5, further comprising the step of estimating one of said parameter for at least one type of image acquiring device with which color images are digitally acquired, by analyzing the sharpness of the images acquired by the device.

7. The method of claim 5, further comprising the step of estimating one of said parameter directly on the color image to be up-scaled by analyzing character edges of characters in the color image.

8. The method of claim 1, wherein said second up-scaling method is a bilinear method.

9. The method of claim 1, wherein the scaling factor is an input parameter.

10. The method of claim 1, including converting a color image into luminance and chrominance layers and performing character recognition using at least the luminance layer.

11. The method according to claim 10, characterized in that the color image is obtained by digitally acquiring a document at a lower resolution and subsequently up-scaling the digitally acquired image to a higher resolution.

12. The optical character recognition method according to claim 11, wherein the document is a business card.

13. A computer program product stored in a non-transitory computer-readable memory, comprising software code portions for performing the steps of claim 1 when said product is run on a computer.

14. A computer program product comprising software code portions stored on a non-transitory computer usable medium for performing the steps of claim 1 when said product is run on a computer.

* * * * *